United States Patent

Heine et al.

[11] Patent Number: 5,903,121
[45] Date of Patent: May 11, 1999

[54] APPARATUS FOR TRIGGERING A DC MOTOR WITH A PROTECTIVE CIRCUIT PREVENTING SUBSTRATE CURRENTS

[75] Inventors: Martin Heine, Geisling; Alfons Fisch, Falkenstein; Theodor Maier, Aiglsbach, all of Germany; Gerhard Goeser, Tournefeuille, France

[73] Assignee: Siemens Aktiengesellschaft, Munich, Germany

[21] Appl. No.: 08/801,638

[22] Filed: Feb. 18, 1997

[30] Foreign Application Priority Data

Feb. 16, 1996 [DE] Germany ............................ 196 05 834

[51] Int. Cl.$^6$ ....................................................... H02P 7/00
[52] U.S. Cl. .............................. 318/434; 318/439; 361/23
[58] Field of Search ..................................... 318/434, 254, 318/439; 363/56–58; 361/23–31, 91

[56] References Cited

U.S. PATENT DOCUMENTS

| | | | |
|---|---|---|---|
| 3,760,258 | 9/1973 | Percorini et al. ......................... | 363/58 |
| 3,852,656 | 12/1974 | Bourbeau ................................. | 363/58 |
| 4,853,835 | 8/1989 | Furuhashi ................................ | 363/58 |
| 4,977,356 | 12/1990 | Otani et al. ............................. | 318/138 |
| 5,083,067 | 1/1992 | Soushin et al. ......................... | 318/254 |
| 5,450,306 | 9/1995 | Garces et al. ........................... | 363/41 |
| 5,523,660 | 6/1996 | Fujii ......................................... | 363/41 |
| 5,661,383 | 8/1997 | Schlager et al. ........................ | 318/439 |
| 5,731,694 | 3/1998 | Wilcox et al. .......................... | 323/287 |

FOREIGN PATENT DOCUMENTS

| | | |
|---|---|---|
| 1130042 | 5/1962 | Germany . |
| 4038199A1 | 6/1992 | Germany . |

OTHER PUBLICATIONS

"Characterization of the Substrat Diode of TPIC107 and discrete Diodes for Application", Micron Electronic Devices GmbH, dated Mar. 20, 1995, pp. 1, 5 and 6.

Primary Examiner—Jonathan Wysocki
Attorney, Agent, or Firm—Herbert L. Lerner; Laurence A. Greenberg

[57] ABSTRACT

In a method for triggering a DC motor through an integrated H-bridge circuit by using a control circuit and an apparatus for carrying out the method, a high-side transistor switch or a low-side transistor switch associated with each motor terminal, or both of the transistor switches, are each controlled or regulated to a conductive state by a respective guard circuit, if and as long as a potential at a motor terminal is or falls below a predetermined value. Each guard circuit has a biased transistor with a conductive state in which the associated transistor switches are made conducting through a current mirror.

2 Claims, 3 Drawing Sheets

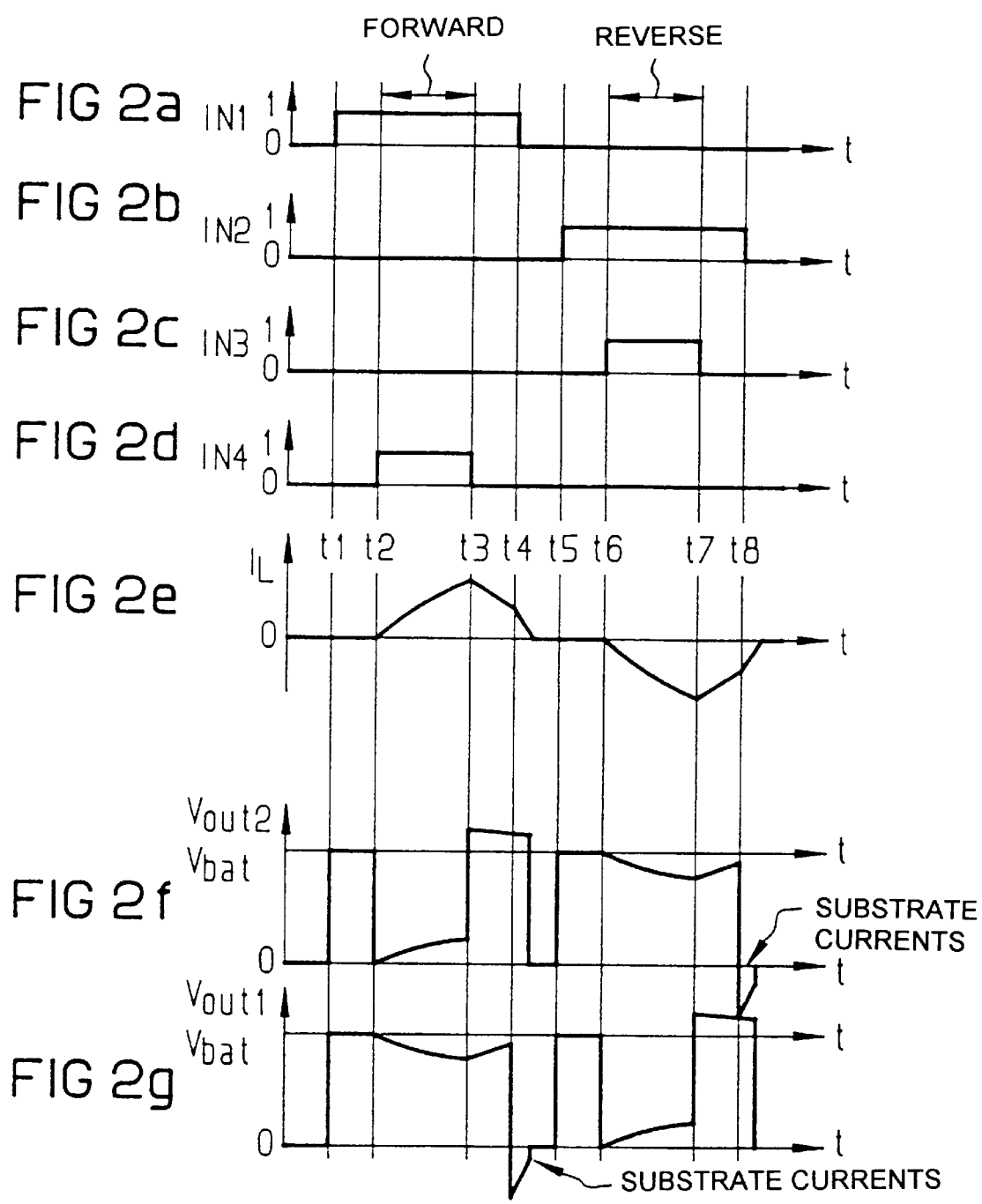

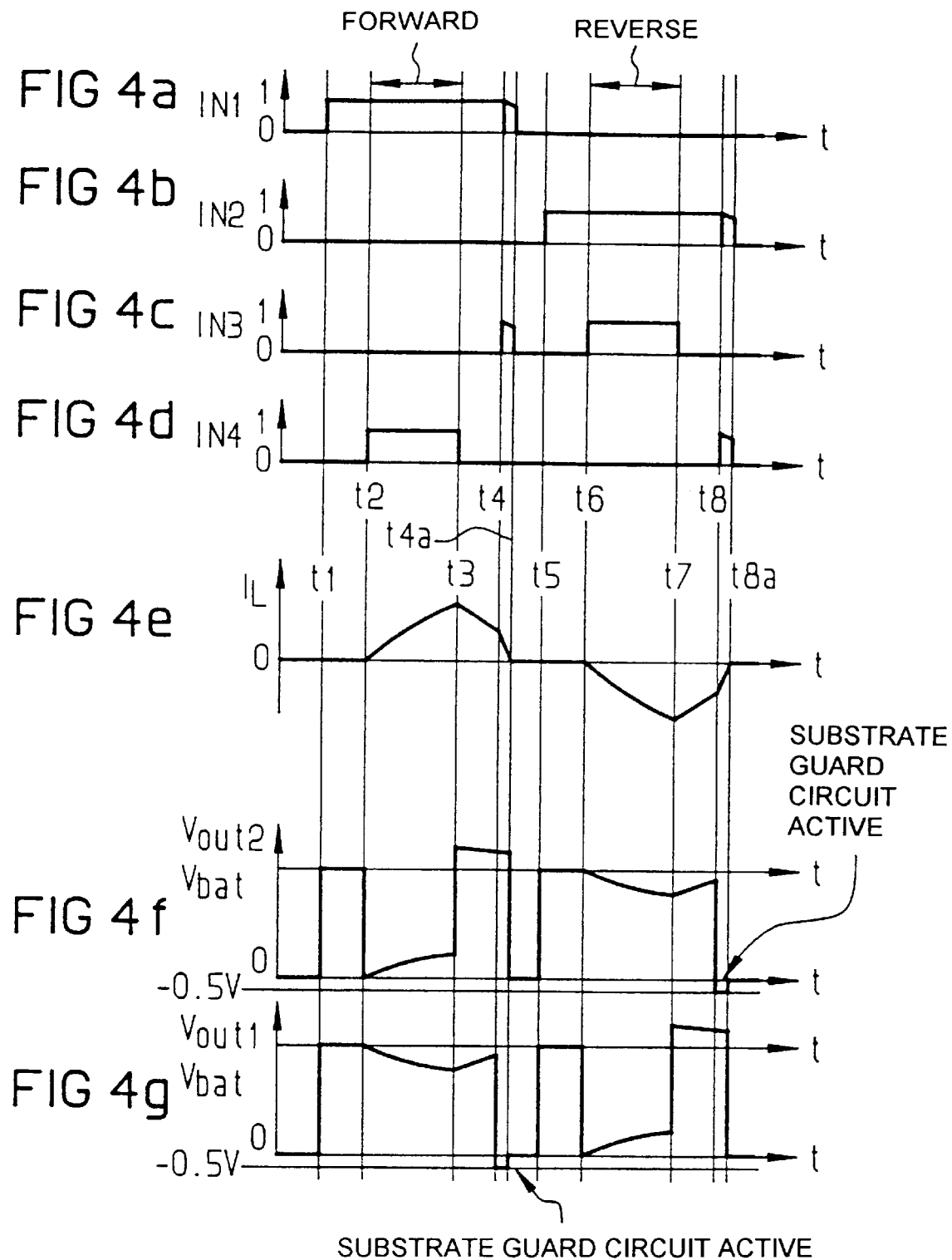

APPARATUS FOR TRIGGERING A DC MOTOR WITH A PROTECTIVE CIRCUIT PREVENTING SUBSTRATE CURRENTS

BACKGROUND OF THE INVENTION

FIELD OF THE INVENTION

The invention relates to a method for triggering a DC motor through an integrated H-bridge circuit, particularly in motor vehicles, and to an apparatus for performing the method, including one high-side transistor switch between each motor terminal and a positive pole of an operating voltage, one low-side transistor switch between each motor terminal and a negative pole of the operating voltage, and one guard circuit, assigned to each motor terminal, for preventing the occurrence of harmful substrate currents.

Integrated H-bridges, which are described in more detail below with regard to FIG. 1, include four monolithically integrated transistors. Depending on the direction of rotation of the motor, either two of the transistors or another two of the transistors are conducting. Upon motor shutoff or switchover, because of the energy stored in the inductance of the motor, negative potential peaks that fall below the ground potential of the operating voltage appear at the motor terminals and can cause so-called substrate currents (on the substrate of the integrated circuit), which can cause the failure of entire functional portions of the integrated circuit.

Until now, external guard diodes have been used which have a diffusion voltage that is below the diffusion voltage of the parasitic substrate diodes of the integrated circuit. Expensive, nonintegrated Schottky diodes have typically been used for that purpose.

A circuit for triggering a DC motor through an H-bridge circuit is known from German Published, Prosecuted Patent Application DE-AS 1 130 042. In order to protect against harmful induction peak voltages, that circuit uses Zener diodes which are connected parallel in the depletion direction to the power transistors connected to the positive pole of the operating voltage. If the operating voltage fluctuates, as happens, for instance, in on-board motor vehicle electrical systems, substrate currents on integrated circuits cannot be avoided with such a structure.

A circuit configuration for triggering a DC motor through an H-bridge circuit is known from German Published, Non-Prosecuted Patent Application DE 40 38 199 A1. In order to limit transient voltage and/or current peaks when the motor is turned on, shut off or switched over, that device contemplates driving a transistor in the just-opened current path in clocked fashion, or short-circuiting the motor through both transistors connected to the same pole of the operating voltage. Once again, that does not make it possible to limit negative voltages to a value that keeps the substrate diodes nonconducting.

SUMMARY OF THE INVENTION

It is accordingly an object of the invention to provide a method for triggering a DC motor and an apparatus for performing the method, which overcome the hereinafore-mentioned disadvantages of the heretofore-known methods and devices of this general type and which protect integrated H-bridges better and more economically against such substrate currents that occur from voltage peaks at motor terminals.

With the foregoing and other objects in view there is provided, in accordance with the invention, a method for triggering a DC motor through an integrated H-bridge circuit by using a control circuit, which comprises connecting each of two high-side transistor switches between a respective one of two motor terminals and a positive pole of an operating voltage; connecting each of two low-side transistor switches between a respective one of the two motor terminals and a negative pole of the operating voltage; assigning each of two guard circuits to a respective one of the two motor terminals, for preventing an occurrence of harmful substrate currents; and controlling or regulating both the high-side transistor switch and the low-side transistor switch associated with one of the motor terminals to a conductive state with the guard circuit, if and as long as a potential at the one motor terminal is or falls below a predetermined value.

With the objects of the invention in view there is also provided an apparatus for triggering a DC motor through an integrated H-bridge circuit by using a control circuit, comprising high-side transistor switches each connected between a respective one of two motor terminals and a positive pole of an operating voltage, each of the high-side transistor switches having a control input; low-side transistor switches each connected between a respective one of the two motor terminals and a negative pole of the operating voltage, each of the low-side transistor switches having a control input; and guard circuits each assigned to a respective one of the two motor terminals for preventing an occurrence of harmful substrate currents; each of the guard circuits including a transistor biased with a predetermined base voltage, the biased transistor having a terminal connected to an associated one of the motor terminals and another terminal; and each of the guard circuits including a current mirror circuit having an input path connected to the other terminal of the biased transistor, an output connected to the control input of the high-side transistor switch connected to an associated one of the motor terminals, and another output connected to the control input of the low-side transistor switch connected to an associated one of the motor terminals.

In accordance with a concomitant feature of the invention, the guard circuit is jointly integrated on the integrated H-bridge circuit.

Other features which are considered as characteristic for the invention are set forth in the appended claims.

Although the invention is illustrated and described herein as embodied in a method for triggering a DC motor and an apparatus for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2a–2g are graphs of current and voltage courses for the known H-bridge circuit;

FIGS. 4a–4g are graphs of current and voltage courses for the H-bridge circuit according to the invention.

DESCRIPTION OF THE PREFERRED EMBODIMENTS

Figure 1:
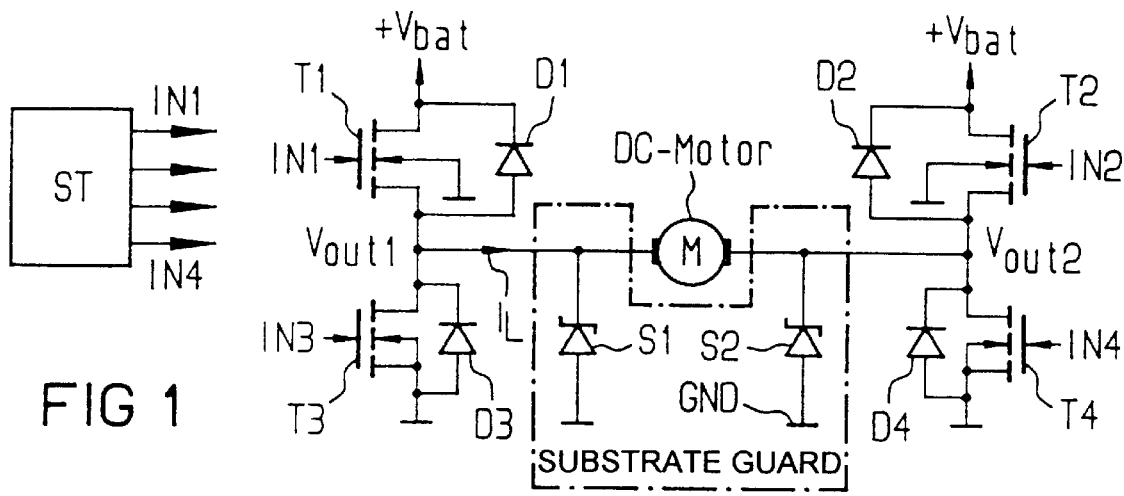
FIG. 1 is a schematic and block diagram of a known H-bridge circuit.

Referring now to the figures of the drawings in detail and first, particularly, to FIG. 1 thereof, there is seen a DC electric motor M with a known H-bridge circuit, having transistor switches T1–T4 that are controlled by a control circuit ST which is not shown in further detail.

The known H-bridge circuit includes the following:

field effect transistors each being in the form of a high-side transistor switch T1, T2 disposed between a respective one of two motor terminals Out1, Out2 and a positive pole $+V_{bat}$ of an operating voltage;

field effect transistors each being in the form of a low-side transistor switch T3, T4 disposed between a respective one of the motor terminals Out1, Out2 and a negative pole GND of the operating voltage; diodes D1–D4 each being connected parallel to a switching path of a respective one of the transistor switches T1–T4, so that the diode allows current to flow in a direction away from the negative pole GND or toward the positive pole $+V_{bat}$; and guard circuits S1, S2 each being assigned to a respective one of the motor terminals Out1, Out2, for preventing the occurrence of harmful substrate currents. Such a guard circuit previously included expensive external, or in other words nonintegrated, Schottky diodes.

It is therefore seen that integrated H-bridges include four monolithically integrated transistors T1–T4. Depending on the direction of rotation of the motor M, either the transistors T1 and T4 or the transistors T2 and T3 are conducting. Due to energy stored in the inductance of the motor, upon motor shutoff or switchover, negative potential peaks $V_{Out1}$ and $V_{out2}$ that fall below the ground potential GND of the operating voltage appear at the motor terminals Out1 or Out2 and can cause so-called substrate currents (on the substrate of the integrated circuit), which in turn can cause the failure of entire functional portions of the integrated circuit.

The external guard diodes which have been used until now have a diffusion voltage which is below the diffusion voltage of the parasitic substrate diodes of the integrated circuit. The expensive, nonintegrated Schottky diodes S1, S2 have typically been used for that purpose.

In FIGS. 2a–2g, current and voltage courses in the known H-bridge circuit and in the DC motor M are shown for both directions of motor rotation. In the case of one rotational direction, "forward", for which the current and voltage courses will be explained below (the same course results for the other rotational direction), the transistor switch T1 is first made digitally conducting at a time t1 by the control circuit ST. That is done by the application of a control signal to an input IN1 at a gate terminal of the field effect transistor switch T1 resulting in the course shown in FIG. 2a. That is followed by an application of a control signal to the transistor switch T4 at a time t2 resulting in the course shown in FIG. 2d. A motor current $I_L$ shown in FIG. 2e then flows from the positive pole $+V_{bat}$ of the battery voltage through the transistor T1, the motor M, and the transistor T4 to the negative pole GND. The motor rotates "forward", until at a time t3 the transistor switch T4 is again made nonconducting by the control circuit ST. The motor current $I_L$ then flows from the positive pole $+V_{bat}$ through the transistor T1, the motor M and the diode D2 back to the positive pole $+V_{bat}$ and decreases in the process (decay of the remaining energy stored in the engine inductance), until at a time t4 the control circuit ST makes the transistor switch T1 nonconducting again. The current then flows from the negative pole GND through the diode D3, the motor M and the diode D2 to the positive pole $+V_{bat}$ and drops rapidly in the process.

Substrate currents are meant to be reduced particularly through the use of staggered turning off of the transistor switches T1 and T4. Those currents occur from the time t4 on (or a time t8 in the case of a "reverse" direction of rotation) and are caused by negative potential peaks shown in FIG. 2f that occur because of the energy stored in the inductance of the motor M when the motor is turned off or switched over, and they are admittedly limited to approximately 0.7 V by the parasitic substrate diodes. However, that makes the substrate diodes become conducting, thus allowing substrate currents to flow. Until now, in order to prevent it, the nonintegrated Schottky diodes S1 and S2 have been used between the negative pole GND and the motor terminals Out1 and Out2 shown in FIG. 1. They limited the voltage peaks to lesser values than 0.7 V and thereby prevented the conducting state of the substrate diodes and the attendant substrate currents.

Figure 3:
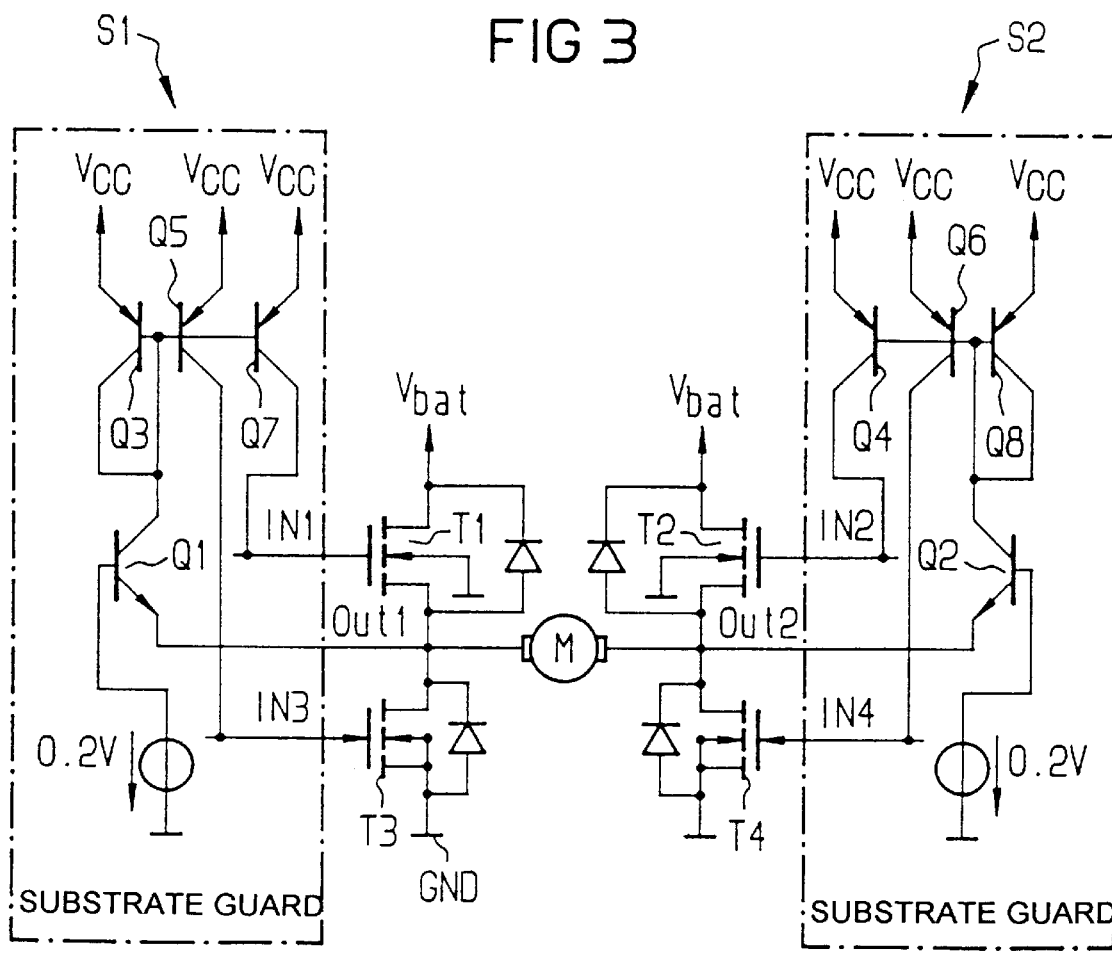
FIG. 3 is a schematic diagram of the H-bridge circuit according to the invention.

FIG. 3 shows the motor M with the H-bridge circuit of FIG. 1, but without the also-necessary control circuit ST. Identical elements are identified with the same reference numerals.

The Schottky diodes S1 and S2 of FIG. 1 are replaced by guard circuits S1 and S2. Due to their identical layout and function, once again only the guard circuit S1 will be described below.

The guard circuit S1, which can advantageously be jointly integrated on the substrate of the H-bridge circuit, has an npn bipolar transistor Q1 that is biased with a predetermined base voltage $V_{b1}$ of +0.2 V, for instance. The npn bipolar transistor Q1 has an emitter which is connected to the motor terminal Out1 and a collector which is connected to a base and a collector of a pnp bipolar transistor Q3. The pnp bipolar transistor Q3 is in turn part of a current mirror circuit including pnp bipolar transistors Q3, Q5 and Q7 each of which has an emitter terminal that is connected to a positive pole of a supply voltage Vcc of the guard circuit S1. This supply voltage may differ from the operating voltage $V_{bat}$. For instance, $V_{bat}$=12 V and $V_{cc}$=16 V.

Base terminals of the transistors Q3, Q5 and Q7 are connected to one another. A collector of the transistor Q5 is connected to the input IN3 of the H-bridge circuit, and a collector of the transistor Q7 is connected to the input IN1 of the H-bridge circuit.

FIGS. 4a–4g show the current and voltage courses in the H-bridge circuit of the invention and in the DC motor M for both directions of motor rotation. The turn-on and turn-off of the transistors T1 and T4 by the control circuit in the period of time from t1 to t4 are carried out precisely as in the exemplary embodiment of FIGS. 2a–2g.

At the time t4, when the transistor T1 is made nonconducting, negative voltage peaks again occur at the motor terminal Out1. However, as soon as they fall below a value of approximately −0.5 V (base bias voltage 0.2 V–0.7 V base-to-emitter diode voltage at the transistor Q1), the transistor Q1 becomes conducting. As a result, a current from $V_{cc}$ flows through the collector-to-emitter paths of the transistors Q3 and Q1 to the motor terminal Out1, which results in currents of equal or proportional magnitude in the collector-to-emitter paths of the transistors Q5 and Q7.

Due to the currents flowing through the collector-to-emitter paths of the transistors Q5 and Q7 into the control inputs of the transistor switches T1 and T3, the transistor switches T1 and T3 are kept conducting (regulated!). This leads to a simultaneous flow of current through the high-side and low-side transistor switches T1 and T3 into the motor terminal Out1. Through the use of this splitting of the current, the power loss can be kept lower than if only one of the two transistor switches were made conducting by the guard circuit. The total of the two currents $I_1+I_2$ flows through the motor M.

The low-side transistor switch T3 furnishes a current $I_1$=0.5V/$R_{DSon}$ ($R_{DSon}$=resistance of the conducting transistor switch), while the current $I_2$ flowing through the high-side transistor switch T1 is adjusted through the trigger transistors in such a way that in the limit case an allowable power loss $P_{max}$ is not exceeded: $I_{2max}=P_{max}/(V_{bat}+0.5 \text{ V})$.

The transistor switches T1 and T3 remain conducting until such time as the negative voltages at the motor terminal Out1, which are limited by this provision to the value −0.5 V (as a result of which the parasitic substrate diodes remain blocked, and no substrate currents can flow), again become greater than −0.5 V, at a time t4a. At this moment, the transistors Q1, Q3, Q5 and Q7 become nonconducting again, and the transistors T1 and T3 take on the function specified by the control circuit.

Procedures that are identical to those described above result if the motor is operated in the "reverse" direction of rotation. This involves times t5 through t8a in FIGS. 4a–4g, but with different reference symbols:

Out1 becomes Out2; Q1 becomes Q2;
T1 becomes T2; Q3 becomes Q8;
T4 becomes T3; Q5 becomes Q6;
T3 becomes T4; Q7 becomes Q4.

We claim:

1. An apparatus for triggering a DC motor through an integrated H-bridge circuit by using a control circuit, the apparatus comprising:

high-side transistor switches each connected between a respective one of two motor terminals and a positive pole of an operating voltage, each of said high-side transistor switches having a control input;

low-side transistor switches each connected between a respective one of the two motor terminals and a negative pole of the operating voltage, each of said low-side transistor switches having a control input; and guard circuits each assigned to a respective one of the two motor terminals for preventing an occurrence of harmful substrate currents;

each of said guard circuits including a transistor biased with a predetermined base voltage, said biased transistor having a terminal connected to an associated one of the motor terminals and another terminal; and each of said guard circuits including a current mirror circuit having an input path connected to the other terminal of said biased transistor, an output connected to the control input of said high-side transistor switch connected to an associated one of the motor terminals, and another output connected to the control input of said low-side transistor switch connected to an associated one of the motor terminals.

2. The apparatus according to claim 1, wherein said guard circuit is jointly integrated on the integrated H-bridge circuit.

* * * * *